United States Patent
Kroll et al.

(12) 
(10) Patent No.: US 6,397,657 B1
(45) Date of Patent: *Jun. 4, 2002

(54) APPARATUS AND METHOD FOR TESTING TORSION BARS

(75) Inventors: William P. Kroll, Medina; Randie Evenson, Brooklyn Center; Karl J. F. Kroll, Maple Grove, all of MN (US)

(73) Assignee: Intercomp Company, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,884

(22) Filed: Dec. 3, 1998

Related U.S. Application Data (60) Provisional application No. 60/067,544, filed on Dec. 4, 1997.

(51) Int. Cl.[7] ............................................. G01H 13/00
(52) U.S. Cl. ..................................... 73/11.05; 73/11.07
(58) Field of Search ............................ 73/118.1, 11.07, 73/11.05

(56) References Cited

U.S. PATENT DOCUMENTS

| | | | |
|---|---|---|---|
| 4,150,559 A | * | 4/1979 | Levy ........................... 73/1 C |
| 4,682,498 A | * | 7/1987 | Kreiskorte .................... 73/618 |
| 4,768,374 A | * | 9/1988 | Fouchey ..................... 73/118.1 |
| 5,382,007 A | * | 1/1995 | Holzeimer .................. 267/154 |
| 5,392,874 A | * | 2/1995 | Chandler ................ 73/862.332 |
| 5,442,956 A | * | 8/1995 | Persson ..................... 73/118.1 |
| 5,517,847 A | * | 5/1996 | Campbell et al. .......... 73/11.07 |
| 5,641,916 A | * | 6/1997 | Satoh et al. ........... 73/862.331 |
| 6,199,427 B1 | * | 3/2001 | Kroll et al. .................... 73/161 |

* cited by examiner

*Primary Examiner*—Max Noori
*Assistant Examiner*—Maurice Stevens
(74) *Attorney, Agent, or Firm*—Skinner & Associates (57) ABSTRACT

An apparatus for testing torsion bars, comprising a frame, a load cell, a connector, a torque arm and a force applicator. The frame includes a torque end support positioned a predetermined distances from a load cell end support. The load cell is attached to the load cell end support, and the connector is rotatably attached to the torque end support. A torsion bar is connected to and extends between the load cell and the connector. The torque arm has a proximal portion attached to the connector, and at least one distal portion. The force applicator is attached to the distal portion of the torque arm and to the frame. The force applicator rotates the torque arm and provides a torque force to the torsion bar. The invention further comprises a method for testing and measuring the spring rate of torsion bars, comprising the steps of: installing a torsion bar on a torsion bar tester; zeroing the torsion bar tester; pumping a jack on the torsion bar tester to twist the torsion bar until an angle indicator on the torsion bar tester displays the desired angle; and reading a force indicator on the torsion bar tester.

26 Claims, 5 Drawing Sheets

APPARATUS AND METHOD FOR TESTING TORSION BARS

CROSS-REFERENCE TO RELATED APPLICATIONS, IF ANY

This application claims the benefit under 35 U.S.C. §119(e) of co-pending provisional application Ser. No. 60/067,544, filed Dec. 4, 1997.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to testing apparatus and methods. More particularly, the invention relates to electromechanical testing apparatus for measuring the spring rate of torsion bars used on automobiles.

2. Background Information

Balancing a car optimizes performance, particularly the cornering characteristics of a racing class automobile. The traction, adherence or grip between the tires and the track at each end of a car is proportional to the percentage of the weight at that end of the car. A car's grip is optimized when both the front tires and the rear tires begin to slide at the same time and at the same rate, resulting in the car having responsive, near-neutral handling characteristics. However, if the front tires slide first, the car tends to understeer and slide off of the track, and if the rear tires slide first, the car tends to oversteer and spin.

Numerous factors contribute to the near-neutral handling characteristics of a balanced car, including tires, wheel alignment, suspension, weight distribution, center of gravity and aerodynamics. A properly suspended car has more braking and acceleration control when the car is moving in a straight line and more steering control when the car is maneuvering around corners.

A torsion bar suspension controls the lateral transfer of weight during cornering without degrading other aspects of the ride quality. A torsion bar suspension exerts resistance against up and down movement by using the flexible lengthwise twisting of a steel bar or tube to provide spring action, rather than the flexing action of a leaf spring or the compressing-and-extending action of a coil spring. One end of the bar is fixed solidly to a part of the frame behind the wheel, and the other end of the bar is attached to the lower control arm which rises and falls with wheel movement. The bar twists and absorbs shocks when the wheel rises and falls due to pressure and untwists when the pressure is released.

Torsion bars function as torsion springs and generally provide a stiff suspension while a car negotiates corners. Torsion bars may be used as anti-sway bars to reduce body roll by keeping the car flatter in turns. The anti-sway bars transfer the pressure exerted on the outbound wheels and apply opposite pressure to the inbound wheels to apply weight more evenly to all four wheels, which helps the vehicle stay level with the load. Stiffer torsion bars transfer more weight to the outside wheel during cornering. A stiffer or thicker front torsion bar causes the front tires to slide more quickly and causes the car to understeer, and a softer or thinner front torsion bar causes the car to oversteer. A stiffer or thicker rear torsion bar causes the rear tires to slide more quickly and causes the car to oversteer and a softer or thinner torsion bar causes the car to understeer.

Torsion bars have a spring rate that identifies the amount of resistance that it provides against up and down movement. This spring rate may change over time and may change because of use. It is therefore desirable to be able to accurately measure the spring rate of torsion bars in order to calculate the resistant force, balance the car, and ultimately improve the handling characteristics of the car.

Applicants' invention provides an apparatus and method for testing and measuring the spring rate of torsion bars which is believed to constitute an improvement over existing technology.

BRIEF SUMMARY OF THE INVENTION

The present invention provides an apparatus for testing and measuring the spring rate of torsion bars, or torsion bar tester, which generally comprises a frame, a load cell attached to the frame, a connector movably supported by the frame, a torque arm connected to the connector, a force applicator connected to the frame and to the torque arm, and a force indicator. One end of a torsion bar is connected to the load cell and the other end of the torsion bar is connected to the connector. The force applicator is positioned between the frame and the torque arm, and applies a torque force to the torsion bar at the connector. The force indicator, preferably a digital display, accurately displays the torque force applied to the torsion bar as gauged by the load cell. An angle indicator may be used in conjunction with a potentiometer to measure the angular displacement of the torsion bar for an applied torque force. The torsion bar tester accommodates torsion bars within a wide range of lengths and diameters. Furthermore, the torsion bar tester can apply a torque force in either rotational direction to accommodate torsion bars that have been installed as part of a car's suspension and have undergone a torque force in a particular rotational direction. Once a torque force has been applied to a torsion bar, it may be undesirable to apply a torque force in the other rotational direction. An angle indicator, preferably a digital display, accurately displays the angular displacement as the torsion bar is twisted up to 25 degrees in either direction.

The torsion bar tester accurately determines the true spring rate of a torsion bar without any effects of friction that could skew the results. The structural design of the torsion bar tester isolates the load cell on one side of the torsion bar while a torque force is applied to the other side. Additionally, the torsion bar tester minimizes slippage with the torsion bar when the torque force is applied.

The features, benefits and objects of this invention will become clear to those skilled in the art by reference to the following description, claims and drawings.

DETAILED DESCRIPTION

Figure 1:
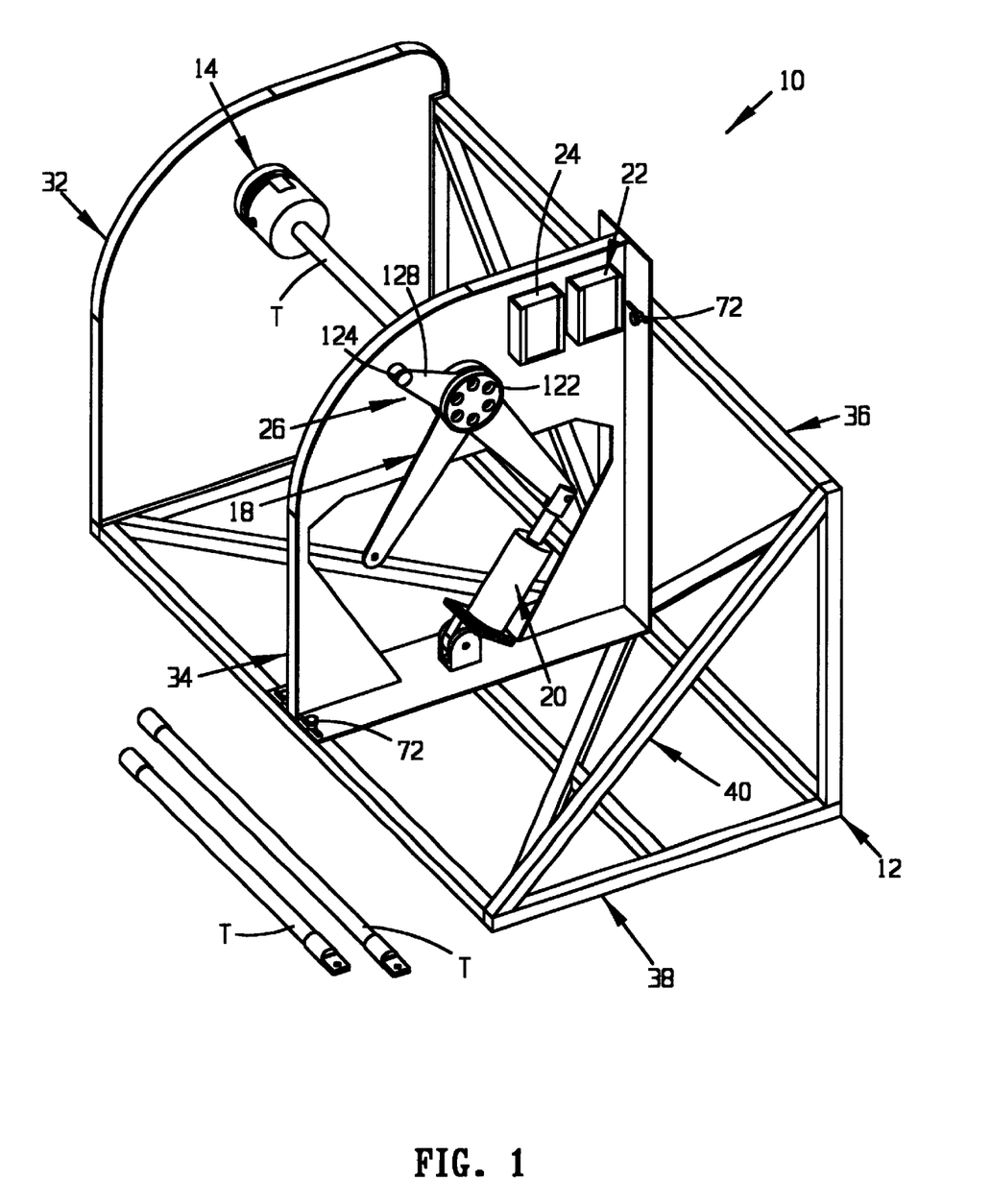
FIG. 1 is a perspective view of the apparatus for testing torsion bars of the present invention.
Figure 2:
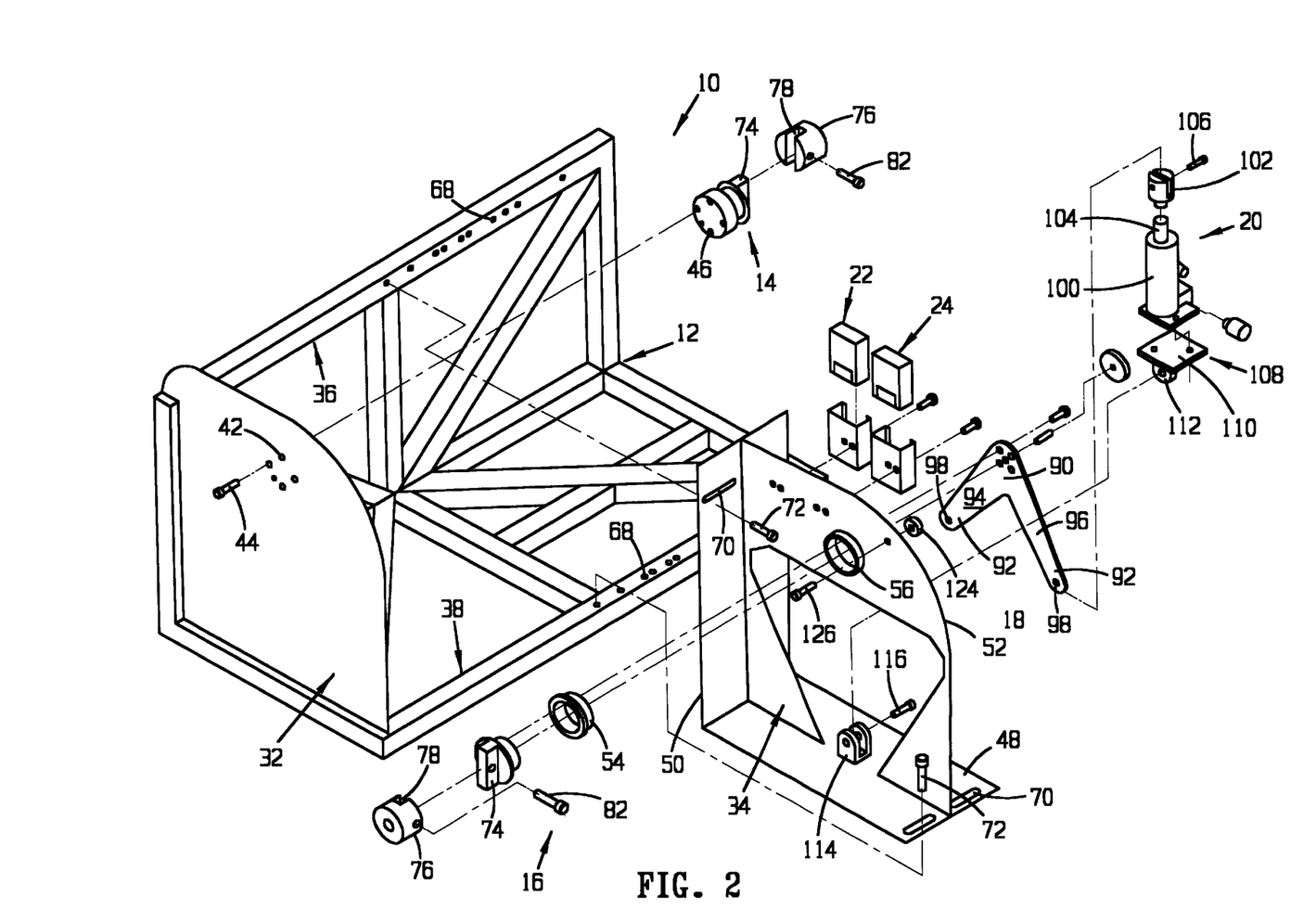
FIG. 2 is an exploded perspective view of the apparatus of FIG. 1.
Figures 3, 4:
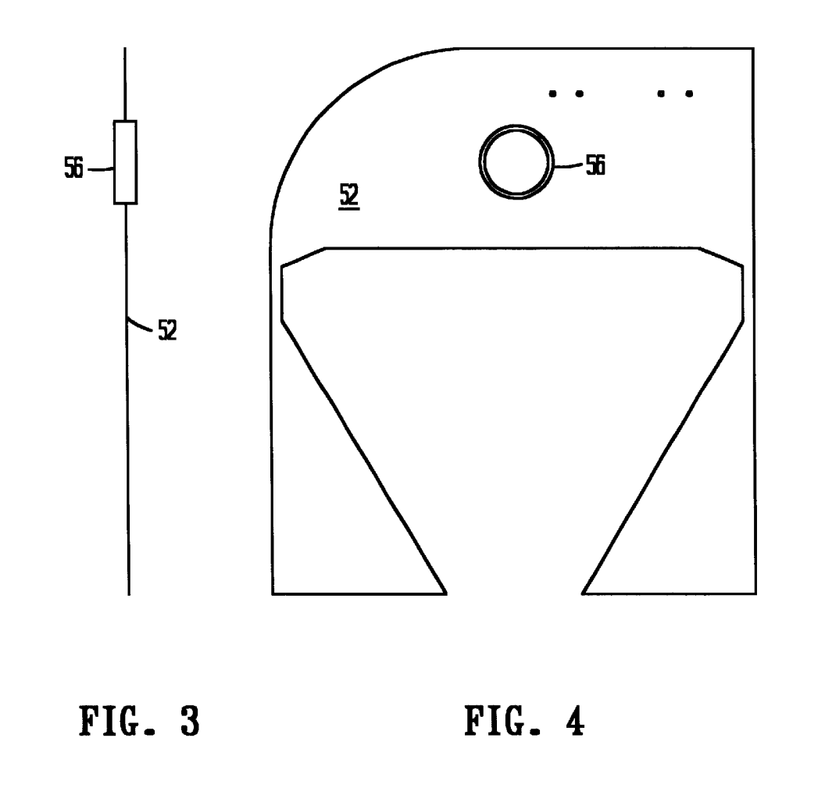
FIG. 3 is an end view of the support plate of the apparatus of FIG. 1.
FIG. 4 is a side view of the support plate of FIG. 3.

Referring to FIGS. 1–2, an example of the preferred embodiment of the present invention is illustrated and generally indicated by the reference numeral 10. The apparatus for testing torsion bars, or torsion bar tester 10, generally comprises a frame 12, a load cell 14 attached to the frame 12, a connector 16 movably supported by the frame 12, a torque arm 18 connected to the connector 16, a force applicator 20 connected to the frame 12 and to the torque arm 18, and a force measurement display 22. One end of a torsion bar T is connected to the load cell 14 and the other end of the torsion bar T is connected to the connector 16. The force indicator 22 displays the amount of torque force applied to the torsion bar T as measured by the load cell 14. An angle indicator 24 may be used, along with an angular displacement measurement mechanism 26, to display the measured angular displacement of the torsion bar resulting from an applied torque force.

Figure 5:
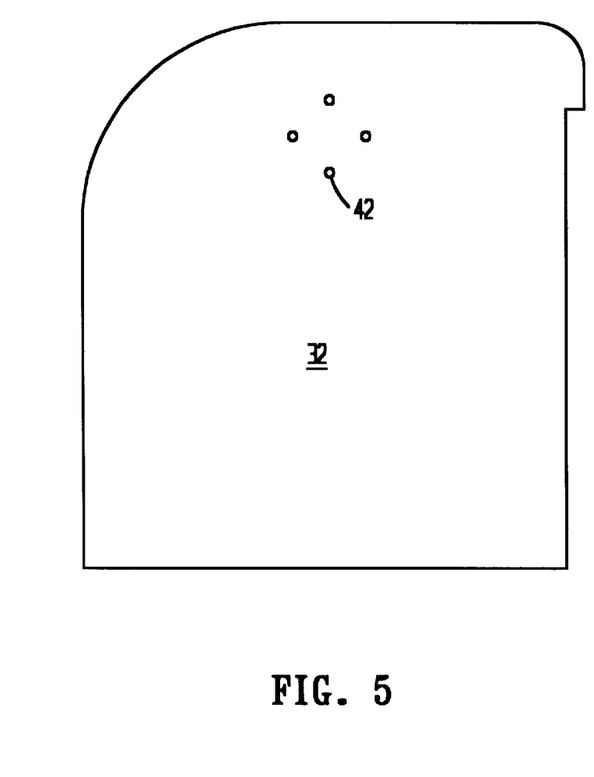
FIG. 5 is a side view of the load cell support plate of the apparatus of FIG. 1.

Referring also to FIGS. 3–8, the frame 12 generally comprises a load cell end support 32, a torque end support 34, an upright portion 36, a base portion 38, and an end brace 40. As shown in FIGS. 2 and 5, the load cell end support 32 is preferably a plate-like structure, and has a mounting apertures 42. Fasteners 44 extend through the apertures 42 and turn into the threaded apertures 46 in the load cell 14 to secure the load cell 14 to the load cell end support 32. The torque end support 34 generally includes an adjustable base plate 48, an adjustable upright plate 50, and a support plate 52. A bushing 54 fits within a sleeve 56 formed in the support 52. The support plate 52 and the load cell support plate 32 are preferably constructed from steel sheets and are parallel with each other and perpendicular with the torsion bar T. The sleeve 56 is preferably aligned with the mounted load cell 14 allowing a torsion bar T to orthogonally extend from the load cell 14 to the sleeve 56.

Figure 6:
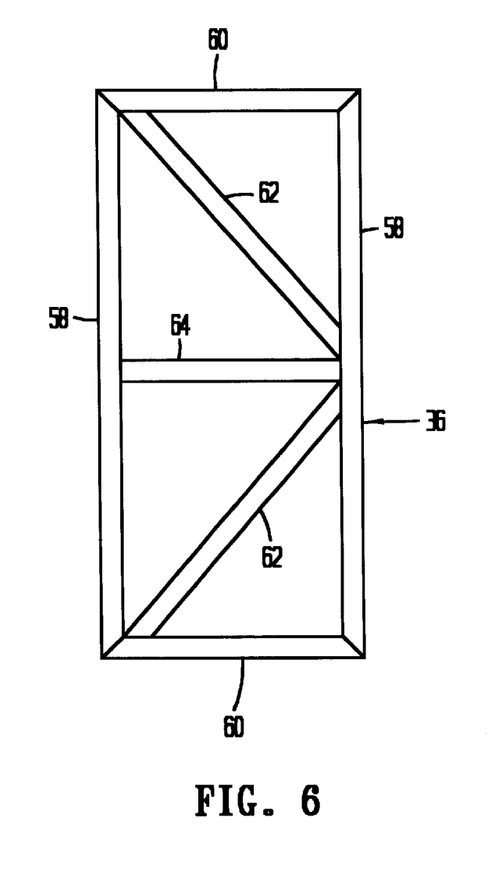
FIG. 6 is a planar view of the upright portion of the frame of the apparatus of FIG. 1.
Figure 7:
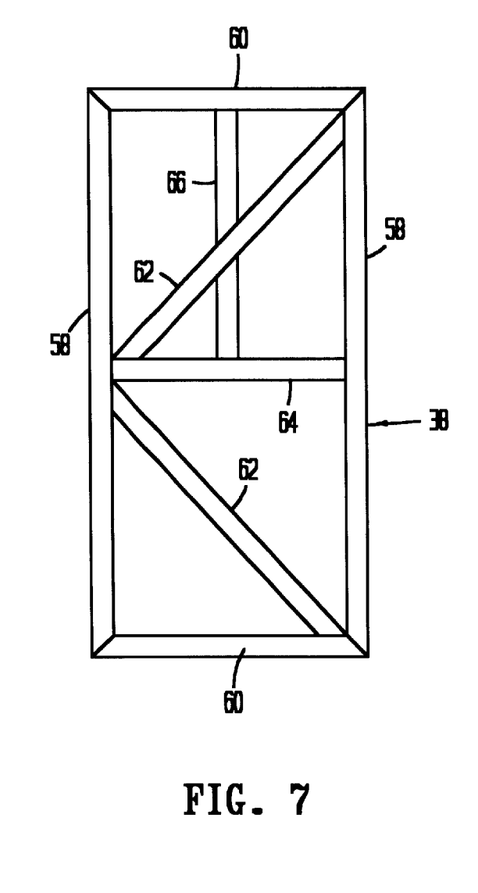
FIG. 7 is a planar view of the base portion of the frame of the apparatus of FIG. 1.
Figure 8:
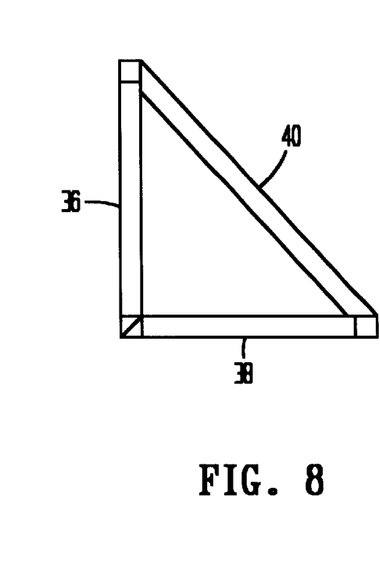
FIG. 8 is a planar view of the end brace of the frame of the apparatus of FIG. 1.

The upright portion 36, base portion 38 and end brace 40 are preferably welded from segments of square tubing. The upright portion 36 and base portion have a number of segments, including sides 58, side braces 60, cross braces 62, and a center brace 64. Additionally, the base portion 38 has a reinforcing jack support 66. The extended sides 58 of the upright portion 36 and base portion 38 have threaded apertures 68 spaced at predetermined positions from the load cell end support 32. The base plate 48 and upright plate 50 have adjustment slots 70. Fasteners such as locking knobs 72 extend through the slots 70 and screw into the apertures 68. Upon being tightened, the locking knobs 72 secure the torque end support 34 to the upright portion 36 and base portion 38. The torsion bar tester 10 therefore can accommodate torsion bars having a wide range of lengths by moving the torque end support 34 a desired distance from the load cell end support 32 and then tightening the knobs 72 to secure the torque end support 34 is in the desired position.

The load cell 14 and the connector 16 both have splines 74. Torsion bar adapters 76, each having a keyway 78 sized to receive the splines 74, are fitted onto both ends of the torsion bar T. Each of the adapters 76 have two screws (not shown) to secure the adapters 76 on the ends of the torsion bar T and further have a pin 82 through which the spline 74 is secured within the keyway 78. The adapters 76 may vary in size to accommodate torsion bars having a wide range of diameters.

The torque arm 18 has a proximal portion 90 attached to the connector 16 and at least one distal portion 92. Preferably, the torque arm 18 is v-shaped, wherein the proximal portion 90 is formed at the apex of the torque arm 18 and forms a pivot. The distal portions of the torque arm 18 are preferably formed by a first lever 94 and a second lever 96. The proximal portion 90 and connector 16 are rotatably secured to the torque end support 34 within the bushing 54. Each of the levers 94 and 96 has a distal portion 92 with an aperture 98. The force applicator 20 is secured to one of the levers 94 and 96 by inserting a pin through the apertures 98.

The force applicator 20 preferably comprises a jack, and in a most preferred embodiment, a hydraulic jack 100. A slotted jack adapter 102 fits on top of the jack piston 104. A distal portion 92 of the torque arm 18 fits within the slot of the adapter 102. A pin 106 secures the adapter 102 to the torque arm 18 by sliding through an aperture in the adapter 102 and through one of the apertures 98 in the torque arm 18. The bottom of the jack 100 is attached to a jack mount 108, which generally comprises a platform 110 and a tongue 112. The base portion 48 of the torque end support 34 has a u-shaped hitch mount 114 generally comprised of two parallel members. A pin 116 extends through apertures in the tongue 112 and the parallel members of the hitch mount 114 to pivotally connect the jack 100 to the frame 12. The jack support 66 reinforces the torque end support 52 directly beneath the jack 100 and prevents the base portion 70 from bending due to the force exerted by the jack 100.

The torsion bar tester 10 has an angular displacement measurement mechanism 26. The mechanism 26 preferably includes a first gear 122 attached to the pivot point of the torque arm 18 via a dowel pin, a second gear 124 connected to a potentiometer 126 that is mounted on the torque end support 34, and a belt 128 connecting the first gear 122 to the second gear 124. Therefore, since the first gear 122 is attached to the torque arm 18 that is secured to the end of the torsion bar T through the connector 16, the potentiometer 126 measures the twisting motion or rotation displacement of the torsion bar T. Torsion bars may twist up to twenty-five degrees in either direction for a total of fifty degrees of motion. It is desirable to have a six-to-one gear ratio between the first gear 122 and the second gear 124 in order to improve the resolution or accuracy of a single turn potentiometer 126. The gear ratio causes the fifty degrees of motion in the torsion bar to correspond with three hundred degrees of motion in the single turn potentiometer.

Figure 9:
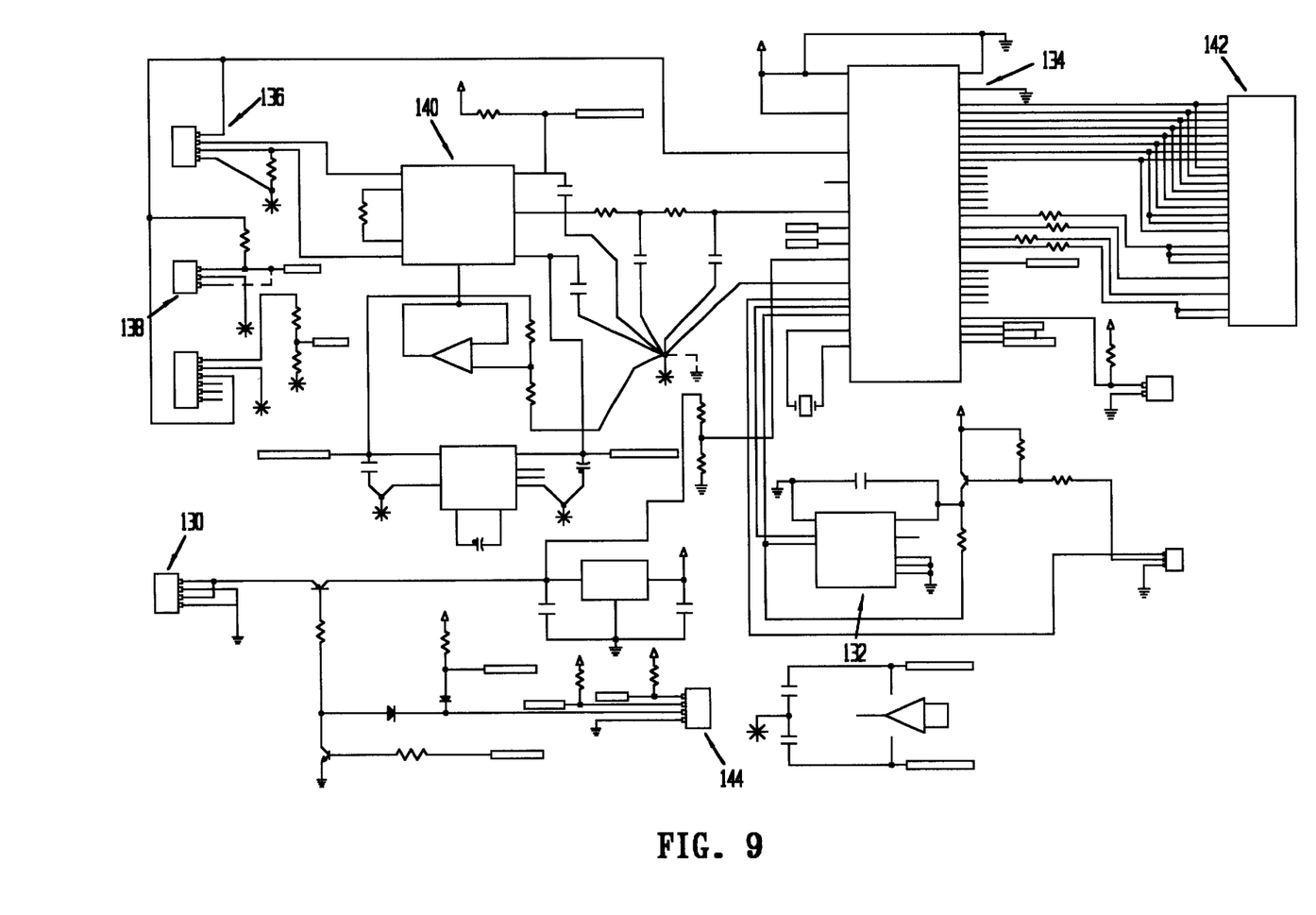
FIG. 9 is a schematic of the electronic circuitry for the apparatus of FIG. 1.

The force indicator 22 and the angle indicator 24 are preferably LCD digital readouts. The force indicator 22 displays the torque force applied to the torsion bar T and is electrically connected to the load cell 14. The angle indicator 24 displays the angular displacement of the torsion bar resulting from an applied torque force and is electrically connected to the potentiometer 126. FIG. 9 is a schematic diagram of the electronic controls for the present invention. The circuitry contains a power supply, which is in this case a battery 130, an EEPROM 132 for holding a program and calibration data, a microcontroller 134 for performing the operations of the program and for performing analog/digital conversions, a load cell input 136 for sensing or reading the strain gauges of the load cell 14, a potentiometer input 138 for sensing or reading the rotational position of the potentiometer 126, a signal amplifier 140 for amplifying and conditioning the signals form the load cell input 136 and potentiometer input 138, a LCD display output connector 142 for electrically interfacing with and driving the force indicator 22 and the angle indicator 24, and a keypad input connector 144 for electrically interfacing with a keypad or other input device.

Installing a torsion bar on the torsion bar tester in preparation for measuring the spring rate of torsion bars generally includes the following steps:

1. Selecting the proper spline adapters for a torsion bar of a given diameter.
2. Fitting the spline adapters onto both ends of the torsion bar.
3. Adjusting the movable torque end support to match the length of the torsion bar, including tightening the locking knobs once the torque end support is in the desired position and is perpendicular to the torsion bar.
4. Placing the torsion bar and adapters into the torsion bar tester.
5. Inserting the pins through the apertures in the load cell and through the apertures in the connector.
6. Tightening the two screws found on each of the two spline adapters.
7. Determining the desired rotational direction (clockwise or counterclockwise) of the applied torque force.
8. Inserting the jack pin through the aperture in the appropriate lever of the torque arm to twist the torsion bar either clockwise or counterclockwise.

Manufacturers of torsion bars often will have their own recommended procedures for testing torsion bars. These procedures may include averaging measurements from several tests and specific steps for pre-loading the torsion bar prior to zeroing the tester. The torsion bar tester is a testing apparatus that may be used in a variety of these procedures. Regardless of the procedure followed, it is important to consistently perform that procedure so that accurate comparisons can be made. The method of using the torsion bar tester to measure the spring rate of torsion bars may include the following steps:

1. Zeroing the torsion bar tester, which may include the steps of:
   (a) Pumping the jack to apply a torque force to the torsion bar, wherein the force may twist the torsion bar approximately 5–10 degrees;
   (b) Opening the jack valve to lower the jack; and
   (c) Zeroing the angle indicator and the force indicator.
2. Pumping the jack to twist the torsion bar until the angle indicator displays the desired angle.
3. Reading the force indicator.

Since a used or set torsion bar has a particular shape during non-load conditions and since the spring rate of a new or set torsion bar may differ, it is desirable to set a new torsion bar by pre-loading it by applying a torque force. Once the new torsion bar has been set to mimic its installed condition, the spring rate of the torsion bar can be accurately measured. Additionally, the torsion bar tester may be used to unwrap and reset a left side torsion bar, for example, into a right side torsion bar through a pre-loading process. Similarly, upon a changeover from testing a right side torsion bar to a left side torsion bar, or vice versa, it is desirable to set the load cell to cancel any errors that may occur because of the change in the direction of the torque force. The load cell is set through a pre-loading process.

A torsion bar and the load cell may be pre-loaded using the torsion bar tester by performing the following steps:

1. Pumping the jack to apply a torque force to the torsion bar, wherein the force may twist the torsion bar approximately 5–10 degrees.
2. Maintaining the applied torque force to the torsion bar for a predetermined duration.
3. Opening the jack valve to lower the jack.
4. Performing steps 1–3 for a predetermined number of cycles.

The force exerted on the end of a torsion bar can be calculated based on a torque reading from the force indicator and on the length of the torsion bar. The general equation for torque is:

$$\text{Torque on Torsion Bar} = \frac{\text{Length of Torque Arm}}{\text{Force Applied on End of Torque Arm}}$$

Therefore, $$\text{Force Applied on End of Torque Arm} = \frac{\text{Length of Torque Arm}}{\text{Torque on Torsion Bar}}$$

For example, it is desired to know the suspension force on the free end of a 10 inch torque arm when the torsion bar is twisted 5 degrees. The reading on the torque indicator is 300 ft-lb. when the torsion bar is twisted 5 degrees. Therefore, Force Applied on End of Torque Arm =

$$\frac{300 \text{ ft-lb.}}{(10 \text{ inches}/12 \text{ inches per foot})} = 361.4 \text{ lb.}$$

Table 1 is used to determine either the travel distance of the free end of the torsion bar for a given twist, or the twist for a given travel distance of the free end of the torsion bar.

TABLE 1

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 8.0 | 0.14 | 0.28 | 0.42 | 0.56 | 0.70 | 0.84 | 0.98 | 1.12 | 1.27 | 1.41 | 1.55 | 1.70 | 1.85 | 1.99 | 2.14 |
| 8.5 | 0.15 | 0.30 | 0.45 | 0.59 | 0.74 | 0.89 | 1.04 | 1.19 | 1.35 | 1.50 | 1.65 | 1.81 | 1.96 | 2.12 | 2.28 |
| 9.0 | 0.16 | 0.31 | 0.47 | 0.63 | 0.79 | 0.95 | 1.10 | 1.26 | 1.42 | 1.59 | 1.75 | 1.91 | 2.08 | 2.24 | 2.41 |
| 9.5 | 0.17 | 0.33 | 0.50 | 0.66 | 0.83 | 1.00 | 1.17 | 1.33 | 1.50 | 1.67 | 1.85 | 2.02 | 2.19 | 2.37 | 2.54 |
| 10.0 | 0.17 | 0.35 | 0.52 | 0.70 | 0.87 | 1.05 | 1.23 | 1.40 | 1.58 | 1.76 | 1.94 | 2.12 | 2.31 | 2.49 | 2.68 |
| 10.5 | 0.18 | 0.37 | 0.55 | 0.73 | 0.92 | 1.10 | 1.29 | 1.47 | 1.66 | 1.85 | 2.04 | 2.23 | 2.42 | 2.62 | 2.81 |
| 11.0 | 0.19 | 0.38 | 0.58 | 0.77 | 0.96 | 1.16 | 1.35 | 1.55 | 1.74 | 1.94 | 2.14 | 2.34 | 2.54 | 2.74 | 2.95 |
| 11.5 | 0.20 | 0.40 | 0.60 | 0.80 | 1.01 | 1.21 | 1.41 | 1.62 | 1.82 | 2.03 | 2.23 | 2.44 | 2.65 | 2.87 | 3.08 |
| 12.0 | 0.21 | 0.42 | 0.63 | 0.84 | 1.05 | 1.26 | 1.47 | 1.69 | 1.90 | 2.11 | 2.33 | 2.55 | 2.77 | 2.99 | 3.21 |
| 12.5 | 0.22 | 0.44 | 0.65 | 0.87 | 1.09 | 1.31 | 1.53 | 1.76 | 1.98 | 2.20 | 2.43 | 2.66 | 2.88 | 3.11 | 3.35 |

TABLE 1-continued

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 13.0 | 0.23 | 0.45 | 0.68 | 0.91 | 1.14 | 1.37 | 1.60 | 1.83 | 2.06 | 2.29 | 2.53 | 2.78 | 3.00 | 3.24 | 3.48 |
| 13.5 | 0.24 | 0.47 | 0.71 | 0.94 | 1.18 | 1.42 | 1.66 | 1.90 | 2.14 | 2.38 | 2.62 | 2.87 | 3.12 | 3.38 | 3.62 |
| 14.0 | 0.24 | 0.49 | 0.73 | 0.98 | 1.22 | 1.47 | 1.72 | 1.97 | 2.22 | 2.47 | 2.72 | 2.97 | 3.23 | 3.49 | 3.75 |
| 14.5 | 0.25 | 0.51 | 0.76 | 1.01 | 1.27 | 1.52 | 1.78 | 2.04 | 2.30 | 2.56 | 2.82 | 3.08 | 3.35 | 3.61 | 3.88 |
| 15.0 | 0.26 | 0.52 | 0.79 | 1.05 | 1.31 | 1.58 | 1.84 | 2.11 | 2.37 | 2.64 | 2.91 | 3.19 | 3.46 | 3.74 | 4.02 |
| 15.5 | 0.27 | 0.54 | 0.81 | 1.08 | 1.36 | 1.63 | 1.90 | 2.18 | 2.45 | 2.73 | 3.01 | 3.29 | 3.58 | 3.86 | 4.15 |
| 16.0 | 0.28 | 0.56 | 0.84 | 1.12 | 1.40 | 1.68 | 1.96 | 2.25 | 2.53 | 2.82 | 3.11 | 3.40 | 3.69 | 3.99 | 4.28 |

For example, if a given torque force twists a 10 inch torsion bar 5 degrees in the torsion bar tester, the intersection of 5 degrees and a 10 inch arm length in Table 1 indicates that the free end of an installed torsion bar will travel 0.87 inches when it twists 5 degrees. Similarly, if an installed 10 inch torsion bar moves 1.5 inches, Table 1 indicates that the travel distance of the torsion bar corresponds to about a 9 degree twist (the chart shows that a 10 inch torsion bar travels 1.58 inches when it is twisted 9 degrees).

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An apparatus for testing spring rate of vehicle torsion bars, comprising:
   (a) a frame including a torque end support positioned a predetermined distance from a load cell end support;
   (b) a load cell attached to said load cell end support, wherein a first end of a torsion bar separated from a vehicle is connected to said load cell, the load cell being communicatively connected to an indicator for indicating a spring rate;
   (c) a connector rotatably attached to said torque end support, wherein a second end of the torsion bar is connected to said connector;
   (d) a torque arm having a proximal portion and at least one distal portion, said proximal portion of said torque arm being attached to said connector; and
   (e) a force applicator attached to said at least one distal portion of said torque arm and to said frame, wherein said force applicator applies a torque force to the torsion bar through said torque arm and said load cell measures the torque force applied to the torsion bar.

2. The apparatus of claim 1, wherein said torque end support is adjustably positioned a predetermined distance from said load cell end support.

3. The apparatus of claim 1, wherein said frame further includes an upright portion connected to a base portion, both said torque end support and said load cell end support being connected to said upright portion and to said base portion.

4. The apparatus of claim 3, wherein said torque end support includes an adjustable base plate attached to an adjustable upright plate, each of said base plate and said upright plate having at least one adjustment slot, each of said base portion and said upright portion having at least one threaded aperture and at least one knob screwed into said at least one threaded aperture, said at least one knob being screwed through said at least one adjustment slot of said upright plate into said upright portion of the frame, said at least one knob being screwed through said at least one adjustment slot of said base plate and into said base portion.

5. The apparatus claim 1, wherein said load cell is fixedly mounted to said load cell end support.

6. The apparatus of claim 5, wherein said load cell is connected to a spline adapter, said spline adapter being connected to the first end of the torsion bar.

7. The apparatus of claim 1, wherein said connector includes a spline adapter connected to an end adapter, said spline adapter being connected to the second end of the torsion bar, said torque end support having a support plate with an aperture and a bushing positioned within said aperture, said end adapter being rotatably supported within said bushing.

8. The apparatus of claim 1, wherein said torque arm has a first distal portion and a second distal portion, said force applicator being attached to said first distal portion to apply a torque force to the torsion bar in a rotational direction, said force applicator being attached to said second distal portion to apply a torque force to the torsion bar in an opposite rotational direction.

9. The apparatus of claim 1, further including means for displaying wherein the indicator displays the torque force gauged by said load cell.

10. The apparatus of claim 9, wherein said means for displaying the torque force wherein the indicator is a digital readout.

11. The apparatus of claim 1, further including means for measuring wherein said indicator indicates angular displacement of said torque arm and means for displaying the measured angular displacement.

12. The apparatus of claim 11, wherein said means for measuring angular displacement indicator includes a first gear attached to the pivot point of said torque arm, a potentiometer attached to said torque end support, and a second gear attached to said potentiometer, said first gear being connected to said second gear by a belt.

13. The apparatus of claim 11, wherein said means for displaying the measured angular displacement is indicator includes a digital readout.

14. The apparatus of claim 1, wherein said force applicator includes a jack attached to a jack mount, said jack mount being connected to said torque end support, said jack further having an adapter connected to said at least one distal portion of said torque arm.

15. The apparatus of claim 14, wherein said jack is a hydraulic jack.

16. The apparatus of claim 14, wherein said jack mount is pivotally connected to said torque end support.

17. The apparatus of claim 14, wherein said adapter is pivotally connected to one of two distal portions of said torque arm.

18. An apparatus for testing spring rate of vehicle torsion bars, comprising:
(a) a frame including a torque end support and a load cell end support, said torque end support being adjustably positioned a predetermined distance from said load cell end support;
(b) a load cell fixedly mounted to said load cell end support, wherein a first end of a torsion bar separated from a vehicle is connected to said load cell;
(c) a connector rotatably attached to said torque end support, wherein a second end of the torsion bar is connected to said connector;
(d) a torque arm having a proximal portion and at least one distal portion, said proximal portion of said torque arm being attached to said connector;
(e) a force applicator including a jack attached to a jack mount, said jack mount being connected to said torque end support, said jack further having an adapter connected to said at least one distal portion of said torque arm, said force applicator applying a torque force to the torsion bar through said torque arm, the torque force being gauged by said load cell, said torque force causing an angular displacement of said torque arm;
(f) means for displaying the torque force gauged by said load cell;
(g) means for measuring the angular displacement of said torque arm; and
(h) means for displaying the angular displacement of said torque arm.

19. An apparatus for testing spring rate of vehicle torsion bars separated from a vehicle, comprising:
(a) a frame including a torque end support and a load cell end support, said torque end support being adjustably positioned a predetermined distance from said load cell end support, said frame further including an upright portion connected to a base portion, both said torque end support and said load cell end support being connected to said upright portion and to said base portion, said torque end support including an adjustable base plate attached to an adjustable upright plate, each of said base plate and said upright plate having at least one adjustment slot, each of said base portion and said upright portion having at least one threaded aperture and at least one knob screwed into said at least one threaded aperture, said at least one knob being screwed through said at least one adjustment slot of said upright plate into said upright portion of the frame, said at least one knob being screwed through said at least one adjustment slot of said base plate and into said base portion;
(b) a load cell fixedly mounted to said load cell end support, wherein a first end of a torsion bar which is separated from a vehicle is connected to said load cell, said load cell being connected to a spline adapter, said spline adapter being connected to the first end of the torsion bar;
(c) a connector rotatably attached to said torque end support, wherein a second end of the torsion bar is connected to said connector, said connector including a spline adapter connected to an end adapter, said spine adapter being connected to the second end of the torsion bar, said torque end support having a support plate with an aperture and a bushing positioned within said aperture, said end adapter being rotatably supported within said bushing;
(d) a torque arm having a proximal portion and a first distal portion and a second distal portion, said proximal portion of said torque arm being attached to said connector;
(e) a force applicator attached to said frame and to said torque arm, said force applicator applying a torque force to the torsion bar through said torque arm, said force applicator including a hydraulic jack attached to a jack mount, said jack mount being pivotally connected to said torque end support, said jack further having an adapter pivotally connected to one of said distal portions of said torque arm, said adapter being attached to said first distal portion to apply a torque force to the torsion bar in a rotational direction, said adapter being attached to said second distal portion to apply a torque force to the torsion bar in an opposite rotational direction, the torque force being gauged by said load cell, said torque force causing an angular displacement of said torque arm;
(f) digital means for displaying the torque force gauged by said load cell;
(g) means for measuring the angular displacement of said torque arm, including a first gear attached to the pivot point of said torque arm, a potentiometer attached to said torque end support, and a second gear attached to said potentiometer, said first gear being connected to said second gear by a belt; and
(h) digital means for displaying the angular displacement of said torque arm.

20. A method for testing and measuring spring rate of vehicle torsion bars, comprising the steps of:
(a) installing a torsion bar which is separated from a vehicle on a torsion bar tester;
(b) zeroing the torsion bar tester;
(c) pumping a jack on the torsion bar tester to twist the torsion bar until an angle indicator on the torsion bar tester displays the desired angle; and
(d) reading a force indicator on the torsion bar tester.

21. The method of claim 20, wherein the step of installing a torsion bar on a torsion bar tester includes the steps of:
(a) selecting proper spline adapters for a torsion bar of a given diameter,
(b) fitting spline adapters onto both ends of the torsion bar;
(c) adjusting a support to match the length of the torsion bar; and
(d) placing the torsion bar and the spline adapters into the torsion bar tester, the tester including a load cell connected to one end of the torsion bar, a connector connected to the other end of the torsion bar and to the support, a torque arm attached to the connector, and the jack connected to the torque arm.

22. The method of claim 21, further comprising the steps of determining the desired rotational direction of the applied torque force and connecting the jack to the appropriate one of two distal ends of the torque arm.

23. The method of claim 20, wherein the step of zeroing the torsion bar tester includes the steps of:
(a) pumping the jack to apply a torque force to the torsion bar;

(b) opening the angle indicator and the force indicator; and (c) zeroing the angle indicator and the force indicator.

24. The method of claim 20, further including the step of pre-loading the torsion bar and the load cell prior to performing said step of zeroing the torsion bar tester.

25. The method of claim 24, wherein said step of pre-loading the torsion bar and the load cell include the steps of:

(a) pumping the jack to apply a torque force to the torsion bar;

(b) maintaining the applied force to the torsion bar for a predetermined duration; and (c) lower the jack.

26. A method for testing and measuring spring rate of vehicle torsion bars, comprising the steps of:

(a) installing a torsion bar on a torsion bar tester, including the steps of:
  (i) selecting proper spline adapters for a torsion bar of a given diameter,
  (ii) fitting spline adapters onto both ends of the torsion bar;
  (iii) adjusting a support to match the length of the torsion bar; and
  (iv) placing the torsion bar which is separated from a vehicle and the spline adapters into the torsion bar tester, the tester including a load cell connected to one end of the torsion bar, a connector connected to the other end of the torsion bar and to the support, a torque arm attached to the connector, and the jack connected to the torque arm;
  (v) determining the desired rotational direction of the applied torque force; and
  (vi) connecting the jack to the appropriate one of two distal ends of the torque arm;

(b) pre-loading the torsion bar and the load cell;

(c) zeroing the torsion bar tester, including the steps of:
  (i) pumping the jack to apply a torque force to the torsion bar;
  (ii) opening the angle indicator and the force indicator; and
  (iii) zeroing the angle indicator and the force indicator;

(c) pumping a jack on the torsion bar tester to twist the torsion bar until an angle indicator on the torsion bar tester displays the desired angle; and (d) reading a force indicator on the torsion bar tester.

\* \* \* \* \*